Sept. 13, 1966     TAKUZO TSUCHIYA     3,272,110
DISCHARGE DEVICE
Filed May 10, 1963
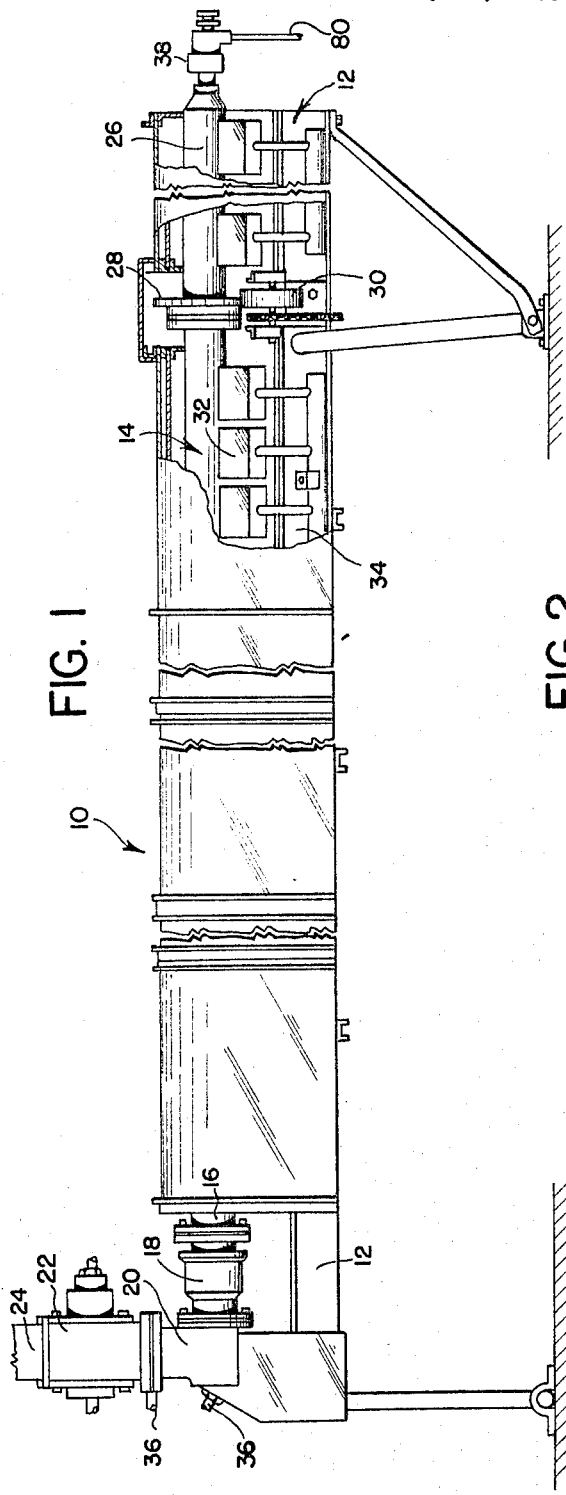
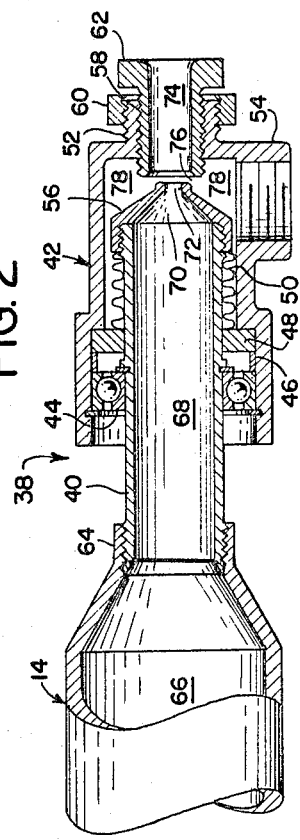
INVENTOR.
TAKUZO TSUCHIYA
BY Robert B Hughes
ATTORNEY United States Patent Office 3,272,110
Patented Sept. 13, 1966

3,272,110
DISCHARGE DEVICE
Takuzo Tsuchiya, Minneapolis, Minn., assignor to General Mills, Inc., a corporation of Delaware
Filed May 10, 1963, Ser. No. 279,561
10 Claims. (Cl. 99—238)

This invention relates generally to a device used in the discharge of a fluid and solid mixture, and more especially to a noise suppressing and fluid recovery mechanism, particularly as applied to the art of continuously processing or puffing materials, as in the final cooking and puffing of preformed cereal dough bodies or pellets.

In the food processing field, apparatus has been devised for the continuous cooking and puffing of preformed cereal dough bodies or pellets, which utilizes an elongated rotating barrel defining a processing chamber having an inlet end into which the food pellets are introduced at a predetermined rate. Steam is continuously fed into the chamber at the inlet end to serve as a processing fluid for the pellets. Movement of the pellets through the barrel's chamber to the discharge end thereof is accomplished partly by the turbulent action of the steam passing through the chamber and partly by moderately inclining the barrel downwardly toward its discharge end, so that the rotation of the barrel about its axis tumbles the contained pellets gradually toward the outlet. To cook the pellets, suitable heaters are provided along the length of the barrel.

The desired puffing or expansion of the food pellets is achieved by moving the pellets rather abruptly from within the chamber (where the pressure is perhaps as high as one hundred pounds per square inch or possibly more) to the outside atmosphere or to a suitable large container where the pressure is nearly atmospheric and the temperature is appreciably lower than that within the chamber. To accomplish this transfer of the food pellets on a continuous basis, the discharge end of the rotating barrel is tapered down to a nozzle, through which the steam (which had previously been traveling through the barrel at an appreciably slower speed) rushes at a speed at, or approaching, the speed of sound. This rush of steam at the discharge end of the barrel carries the food pellets through the nozzle and shoots these pellets in a substantially continuous stream from the nozzle.

One of the problems attendant to such a continuous cooking and puffing process is the extreme and severe noise generated. When the process is practiced on a commercial scale, it not only adds appreciably and quite undesirably to the general plant noise level, but the workers near the cooking and puffing machine must have protective sound dampers for their ears. Another consideration is the high rate at which power is dissipated by the steam continuously discharging into the container for the finished pellets and thence into the atmosphere.

Accordingly it is an object of the present invention to provide a discharge device especially adapted for use with the cooking and puffing apparatus of the type described, which device reduces the level of noise generated by such apparatus and recovers part of the processing fluid (such as the steam) in a usable state, and which does so without interfering with the proper operation of the apparatus.

These and other objects and features of the invention will be more readily understood and appreciated from the following detailed description of the preferred embodiment thereof selected for purposes of illustration and shown in the accompanying drawing, in which:

FIGURE 1 is a side elevational view, partly in sections, of a puffing gun on which is mounted a discharge device or mechanism embodying preferred teachings of my invention.

FIGURE 2 is a longitudinal sectional view, enlarged with respect to FIG. 1, and showing the details of the discharge mechanism of my invention.

Shown in FIG. 1 is a continuous puffing gun, designated generally 10. It includes a suitable frame 12 on which a relatively long cylindrical puffing gun barrel 14 is mounted for rotation on its longitudinal axis. The inlet end 16 of the gun barrel is connected to, and rotatably supported by, a rotary bearing end joint 18 secured to a fixed inlet housing 20. A rotary valve assembly 22 receives the desired material to be puffed through a suitable hopper or feeder 24, and discharges the material into the inlet casing 20, while providing a pressure seal between the interior of casing 20 and hopper 24.

The barrel 14 carries at its outlet end 26 a circular driving flange 28 which rests on two driving rollers 30 by means of which the barrel 14 is rotated on its longitudinal axis at a desired operating speed. The rotating barrel is heated by one or more burner units 32 which are shown as gas burners connected to a suitable gas manifold 34. The inlet casing 20 and valve assembly 22 are provided with a plurality of inlet means, generally designated 36, for the selective introduction of one or more desired gaseous processing fluids, such as preheated steam. The longitudinal axis of the barrel 14 is slanted moderately downward toward the outlet end 26, so that the rotation of the barrel about its axis will tumble the contained food pellets gradually toward the discharge end 26 of the barrel 14.

At the outlet end of the barrel 14 is a discharge mechanism, designated generally 38, to which the subject matter of the present invention is particularly directed. The particular discharge mechanism 38 shown herein was conveniently constructed by making a few simple modifications to a standard T rotary union. It is believed a clearer understanding of the structure and operation of this discharge mechanism 38 will be achieved by first indicating the components thereof which are a part of this standard T rotary union and then indicating the components which were added to complete the structure of this discharge mechanism 38. Thereafter, the manner in which these components cooperate as a functioning apparatus will be disclosed.

The components which are part of a standard T rotary union are a sleeve connector 40, a housing 42 encircling the forward portion of the sleeve connector 40 and extending forwardly therefrom, a bearing assembly 44 by which the housing 42 is rotatably mounted on the connector 40, and sealing means comprising a spacing ring 46, a sealing ring 48, and a sealing bellows 50, which cooperate to seal the rotary connection between the connector 40 and housing 42. The axially aligned end openings of the T are formed, the rear opening by the sleeve connector 40 and the forward opening by the front portion 52 of the housing 42. The branch opening of the T is formed in the housing 42, as an interiorly threaded port defining projection 54 thereof.

The components which are not part of the standard rotary union but were added to complete the discharge mechanism 38 are a nozzle 56 threaded onto the front end of the connecting sleeve 40 (thus replacing a lock nut whose function had been to hold the bellows 50 in place), a cylindrical nozzle expansion section 58 threaded into the front end 52 of the housing 42, and a jam nut 60 threaded onto the front housing portion 52 to engage a radially expanded front portion 62 of the expansion section 58 to hold the same in its proper location with respect to the nozzle 56.

The extreme front end of the main processing barrel 14 is necked moderately to present an interiorly threaded front connecting piece 64 to receive the rear end of the connecting sleeve 40, by which the discharge mechanism 38 is mounted on the barrel 14. The connecting sleeve 40, the nozzle 56, and the expansion member 58 collectively define a discharge passage leading from the processing chamber 66 defined by the barrel 14.

The initial portion 68 of this discharge passage is defined by the connecting sleeve 40 and connects to a convergent passage portion 70 defined by the nozzle 56. This convergent passage portion 70 leads to the throat 72 of the nozzle 56, which in turn opens to an expansion passage portion or chamber 74 defined by a cylindrical bore in the expansion section 58 and having a cross sectional area enlarged with respect to the throat 72.

When this mechanism 38 is assembled in its working position, the expansion section 58 is threaded into the front housing portion 52 until the rear end of the expansion section 58 is spaced moderately forward of the front end of the nozzle 56, and the section 58 is then locked in place by the jam nut 60. Thus the two members 56 and 58 collectively define an annular opening or gap 76 leading from that portion of the discharge passage immediately downstream of the throat 72 into a generally annular relief chamber 78 defined by the forward portion of the housing 42 and the nozzle 56. Thus the annular gap 76 is adjacent the discharge passage 70–74, but is removed therefrom in the sense that it does not project into the main stream of the discharge passage 68–74. The afore-mentioned T branch 54 provides a relief passage leading from this chamber 78 to a suitable recovery line 80.

In operation, food pellets are introduced into the processing barrel 14 through the valve assembly 22 and are gradually carried toward the discharge end 26 of the barrel 14 both by the turbulent action of the steam introduced through the openings 36 and by the rotary action of the barrel about its moderately tilted longitudinal axis. At the necked portion 64 of the barrel 14, the steam from the processing chamber 66 moves somewhat more rapidly into the connecting sleeve 40, and then rushes through the convergent passage portion 70 and out the nozzle throat 72 with a speed at, or approaching, the speed of sound. The food pellets are carried by the steam through the throat 72 at a high velocity in a substantially continuous stream and travel through the expansion chamber 74 into the atmosphere or a suitable large container.

While the main flow of the steam from the processing chamber 66 follows the same course as the food pellets (i.e. through the convergent passage 70, throat 72, and the expansion chamber 74), a portion of this steam is diverted through the annular opening 76 into the relief chamber 78 and then through the outlet 54 to accomplish a partial recovery of the gas at or near critical pressure level. This reduces the total quantity of gas ejected through the expansion section 58. The noise level, being proportional to the total quantity of gas passing out the expansion section 58, consequently is reduced. Since the total quantity of gas passing through the system is fixed by the critical pressure at the throat 72 and by the area of the throat 72, the rate of discharge through the mechanism 38 is essentially the same as that of a conventional nozzle having the same throat area as the throat 72 of the present mechanism. Thus this partial recovery of the steam does not interfere with the proper operation of the puffing gun.

What is claimed is:

1. In a puffing gun from which pellets are discharged with a fluid along a predetermined path, a discharge device comprising a nozzle and a housing having an expansion section, which nozzle and expansion section collectively define a display passage for said pellets and said fluid, said nozzle being located at the discharge end of said gun and defining a restricted throat portion of said discharge passage through which said fluid and said pellets are emitted from said gun in a downstream direction along said predetermined path at a relatively high velocity, said expansion section defining an expansion portion of said discharge passage located downstream of said throat and having an enlarged cross sectional area with respect to said throat, said discharge device defining a relief passage which opens to said discharge passage at a location removed from said path so as to permit fluid in said discharge passage to be diverted from said path into said relief passage while permitting said pellets to be properly discharged through said outlet passage, thereby reducing noise level and enabling the recovery of a portion of said fluid in reusable form.

2. The device as recited in claim 1, wherein said relief passage opens to said discharge passage at a location immediately downstream of said throat.

3. The device as recited in claim 2, wherein said device is formed with a substantially annular opening surrounding said discharge passage, through which opening said relief passage communicates with said discharge passage.

4. The device as recited in claim 3, wherein the upstream end of said expansion section is spaced outwardly from, and downstream of, the downstream end of said nozzle, so as to form said annular opening.

5. The device as recited in claim 4, wherein said section is adjustable along said path so as to enable adjustment of the area of said annular opening to be made.

6. The device as recited in claim 4, wherein there is a rotary junction by which said housing is secured to said nozzle, said junction forming a seal to prevent escape of said fluid therethrough while permitting rotary motion of said nozzle with respect to said barrel.

7. In a puffing gun from which pellets are discharged with a fluid in a downstream direction along a predetermined path, said gun having a nozzle located at the discharge end of said gun and defining a restricted throat through which said pellets and fluid are discharged along said predetermined path, a member having an expansion section adapted to be mounted proximate to said nozzle and defining an expansion passage downstream of said throat, said expansion passage having a cross sectional area enlarged with respect to said throat, said expansion section being aligned with said nozzle so that pellets discharged from the nozzle along said predetermined path pass through said expansion passage, said member having an enclosing structure and being arranged with respect to said nozzle as to form a relief passage opening to said throat and to said expansion chamber at a location spaced from said predetermined path so as to permit a portion of the fluid being emitted from said nozzle to be diverted from said flow path into said relief passage, while permitting said pellets to be properly discharged through said expansion passage, thereby reducing noise level and enabling the recovery of a portion of said fluid in reusable form.

8. The device as recited in claim 7, wherein the upstream end of said expansion section is spaced outwardly from, and downstream of, the downstream end of said nozzle, so as to form a substantially annular opening leading to said relief passage.

9. In combination, a puffing gun having an elongated rotating processing barrel from which pellets are shot under pressure in a medium of pressurized steam, a discharge device comprising a nozzle and a housing having an expansion section, which section and nozzle define a discharge passage through which said pellets and steam are discharged in a downstream direction along a predetermined path in a substantially continuous stream, said nozzle being located at the discharge end of said gun and defining a restricted throat portion of said discharge passage through which said steam and said pellets are emitted from said gun along said predetermined path at a relatively high velocity, said expansion section defining an expansion portion of said discharge passage located downstream of said throat portion and having an enlarged cross sectional area with respect to said throat, said discharge device defining a relief passage which opens to said discharge passage at a location removed from said flow path, so as to permit fluid in said discharge passage to be diverted from said flow path into said relief passage, while permitting said pellets to be properly discharged through said discharge passage, thereby reducing noise level and enabling the recovery of a portion of said steam in reusable form.

10. The combination as recited in claim 9, wherein said housing is a stationary structure joined to said gun by means of a rotary junction, said junction forming a seal to prevent escape of said steam and defining a chamber by which said relief passage communicates with said outlet passage.

References Cited by the Examiner

UNITED STATES PATENTS

| | | | |
|---|---|---|---|
| 2,622,985 | 12/1952 | Haughey et al. | 99—238 |
| 2,863,375 | 12/1958 | Long et al. | 99—238 |
| 3,231,387 | 1/1966 | Tsuchiya | 99—82 |

WALTER A. SCHEEL, *Primary Examiner.*

UNITED STATES PATENT OFFICE
CERTIFICATE OF CORRECTION

Patent No. 3,272,110                                September 13, 1966

Takuzo Tsuchiya

It is hereby certified that error appears in the above numbered patent requiring correction and that the said Letters Patent should read as corrected below.

Column 3, line 72, for "display" read -- discharge --.

Signed and sealed this 1st day of August 1967.

(SEAL)
Attest:

Edward M. Fletcher, Jr.                          EDWARD J. BRENNER
Attesting Officer                                Commissioner of Patents